(12) United States Patent
Song

(10) Patent No.: US 9,783,965 B2
(45) Date of Patent: Oct. 10, 2017

(54) METHOD FOR MANUFACTURING MAIN BODY OF FAUCET

(71) Applicant: Byung Gyou Song, Seoul (KR)

(72) Inventor: Byung Gyou Song, Seoul (KR)

(*) Notice: Subject to any disclaimer, the term of this patent is extended or adjusted under 35 U.S.C. 154(b) by 133 days.

(21) Appl. No.: 14/895,443

(22) PCT Filed: Apr. 25, 2014

(86) PCT No.: PCT/KR2014/003657
§ 371 (c)(1),
(2) Date: Dec. 2, 2015

(87) PCT Pub. No.: WO2014/196736
PCT Pub. Date: Dec. 11, 2014

(65) Prior Publication Data
US 2016/0115679 A1    Apr. 28, 2016

(51) Int. Cl.
*B29C 45/00* (2006.01)
*E03C 1/04* (2006.01)
(Continued)

(52) U.S. Cl.
CPC .......... *E03C 1/0404* (2013.01); *B29B 13/022* (2013.01); *B29C 45/0001* (2013.01);
(Continued)

(58) Field of Classification Search
CPC .......... E03C 1/0404; C25D 7/04; C25D 5/56; C23C 18/1641; C23C 18/48;
(Continued)

(56) References Cited

U.S. PATENT DOCUMENTS 8,464,748 B2 * 6/2013 Pinette .................. E03C 1/0403
                                              137/375
8,739,826 B2 * 6/2014 Thomas .................... E03C 1/04
                                              137/606
(Continued)

FOREIGN PATENT DOCUMENTS

JP      08-226150 A     9/1996
JP    2004-293206 A    10/2004
(Continued)

*Primary Examiner* — Richard Chang
(74) *Attorney, Agent, or Firm* — Jae Youn Kim; Novick, Kim & Lee, PLLC

(57) ABSTRACT

A method for manufacturing a main body of a faucet comprises separately molding a base body in which a valve V is installed, a first part in which a hot water passage and connecting portion are formed, a second part in which the cold water inlet and a connecting portion are formed, and a third part in which a water discharge port and connecting portion are formed, the base body and three parts being formed of a composition of ABS resin and glass fibers and combining the base body with the connecting portions of the three parts; integrating the base body and three parts into a main body of a faucet by overlaying the surfaces of the combined main body with ABS resin molten at temperate of 190° C. to 210° C. by injection molding process; and plating nickel-chromium on the exterior of the main body for protection of external molding portion.

3 Claims, 4 Drawing Sheets

(51) Int. Cl.
*F16K 27/04* (2006.01)
*B29B 13/02* (2006.01)
*C23C 18/16* (2006.01)
*C23C 18/48* (2006.01)
*C25D 5/56* (2006.01)
*C25D 7/04* (2006.01)
*B29L 31/00* (2006.01)
*B29C 45/14* (2006.01)
*B29K 55/02* (2006.01)
*B29K 105/12* (2006.01)
*B29K 309/08* (2006.01)

(52) U.S. Cl.
CPC ........ *B29C 45/0005* (2013.01); *B29C 45/006* (2013.01); *B29C 45/0062* (2013.01); *C23C 18/1641* (2013.01); *C23C 18/48* (2013.01); *C25D 5/56* (2013.01); *C25D 7/04* (2013.01); *F16K 27/044* (2013.01); *B29C 45/14467* (2013.01); *B29C 45/14622* (2013.01); *B29C 2045/0079* (2013.01); *B29K 2055/02* (2013.01); *B29K 2105/12* (2013.01); *B29K 2309/08* (2013.01); *B29K 2995/0016* (2013.01); *B29L 2031/769* (2013.01); *B29L 2031/7698* (2013.01); *E03C 1/04* (2013.01)

(58) Field of Classification Search
CPC ................. B29B 13/022; F16K 27/044; B29L 2031/7698; B29C 2045/0079; B29C 45/0062; B29C 45/006; B29C 45/0001; B29C 45/0005; B29K 2309/08; B29K 2995/00
See application file for complete search history.

(56) References Cited

U.S. PATENT DOCUMENTS 8,991,425 B2 * 3/2015 DeVries .................... E03C 1/04
                                                                     137/625.4
9,403,304 B2 * 8/2016 Thomas .................... E03C 1/04

FOREIGN PATENT DOCUMENTS

| KR | 20-1999-0006148 U | 2/1999 |
| KR | 20-2011-0007205 U | 7/2011 |
| KR | 10-1064920 B1 | 9/2011 |

* cited by examiner

METHOD FOR MANUFACTURING MAIN BODY OF FAUCET

TECHNICAL FIELD

The present invention relates to a method for manufacturing a faucet and, more particularly, to an improved method for manufacturing a main body of a faucet by insert injection molding pre-molded blocks made of corrosion-resistant and non-hazardous materials to human beings with a high heat resistance, which is different from conventional manufacturing methods of a brass faucet, thereby preventing unsanitary conditions from being created inside the faucet, protecting users from getting burns due to high thermal conductivity of the faucet, and reducing manufacturing cost for diverse designs of faucets.

BACKGROUND ART

Generally, a faucet is installed near a bathroom sink or a kitchen sink and is connected to a boiler to allow a user to selectively use cold or hot water.

The main body of the faucet is generally used in combination with a plurality of auxiliary components such as a valve, an operation lever, a packing rubber, and connection hoses. The main body of the faucet is conventionally made of brass because brass is easily shaped in a molding process.

However, in most cases, the work environment in which the main body of a faucet is manufactured using a molding process amuses environmental pollution. Furthermore, hazardous substances (graphite, impurities, or the like) remain on the molded main body. Therefore, the pollutants in the environment of the workplace and/or the hazardous substances used in the molding process remain in the main body of the faucet. When the main body is installed in the faucet, drinking water from the faucet may be hazardous to a person's body. Aside from this, since the working environment in which the molding process is performed is unsanitary and/or dangerous, workers are reluctant to work there.

In addition, when the body of the faucet is installed in the faucet and used, the inside surface of the body is corroded by water after a long period of use, causing unsanitary conditions inside the faucet. This pollutes drinking water and endangers the health of people drinking water from the faucet.

Furthermore, the body of the faucet is made of brass and thus has high thermal conductivity. For this reason, when using hot water, users, especially elderly people and children, can be easily burned, even from having brief skin contact with the faucet.

Further still, since the body of the faucet is manufactured in the form of one integrated body, different molds are used to produce faucets of different designs. This increases the production cost of faucets.

To solve the problems in the conventional brass faucet made by molding process, KR patent No. 10-1064920 allowed to the present applicant suggested a main body of faucet and a method for manufacturing the same. The main body is fabricated by forming internal molding assemblies made of corrosion-resistant and non-hazardous materials to human beings with a high heat resistance, combining the internal molding assemblies in a base body by double injection molding process and plating nickel-chromium onto the exterior of the combined structure, whereby the problems of unsanitary conditions in use of the brass body, and burning risk by high thermal conductivity may be solved.

However, there is another problem that the connecting portions of the combined structure by plating of metals has inferior durability.

DISCLOSURE

Technical Problem

Accordingly, the present invention is to solve the problems mentioned above in the related art, and is intended to provide a method for manufacturing a main body of a faucet improved in preventing unsanitary conditions and protecting users from getting burns due to high thermal conductivity in the prior brass main body of the faucet, thereby achieving long durability, and reducing manufacturing cost for diverse designs of faucets.

Technical Solution

In order to achieve the object, according to one aspect, the present invention provides a method for manufacturing a main body of a faucet which has a hot water inlet and a cold water inlet at both sides, respectively, and a cold/hot water discharge port, in which hot water and cold water are mixed, and is equipped with a valve for stopping a flow of water at an upper portion and a lever for adjusting the valve, the method comprising: separately molding a base body in which the valve is installed, a first part in which the hot water passage is formed, a second part in which the cold water inlet is formed, and a third part in which the water discharge port is formed, the base body and three parts being formed of a composition of ABS resin and glass fibers and the three parts having a connecting portion, respectively; combining the base body with the connecting portions of the three parts; integrating the base body and three parts into a main body of a faucet by forming an external molded portion overlaid on the surfaces of the combined main body with ABS resin molten at temperate of 190° C. to 210° C. by injection molding process; and plating nickel-chromium on the exterior of the main body.

Advantageous Effects

According to the present invention, the main body of a faucet is manufactured by forming a base body and there parts with composite materials of a small deformation and corrosion resistance ABS resin and glass fiber. In this way, the main body of a faucet made by the method according to the present invention present may has improved durability due to the increased integrity thereof, and the weight is reduced to a quarter to the conventional brass faucet, which costs down, facilitating workability in a manufacturing process. And the method of the invention gives a benefit of the manufacture of diverse design faucets.

Furthermore, the method of manufacture according to the present invention may improve poor conditions of conventional brass faucet manufacturing process and harmful content is not detected in use as a faucet since a brass is not used in manufacturing.

BEST MODE

Figure 1:
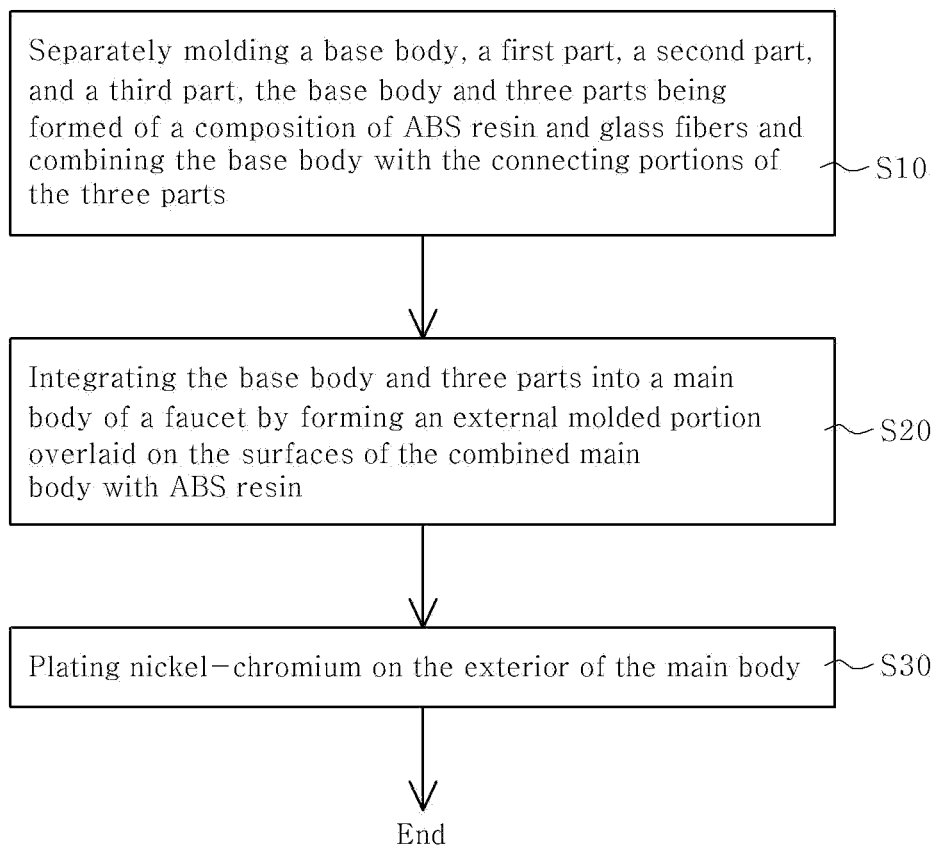
FIG. 1 is a process flowchart sequentially illustrating manufacturing processes of a main body of a faucet according to the present invention.
Figure 2:
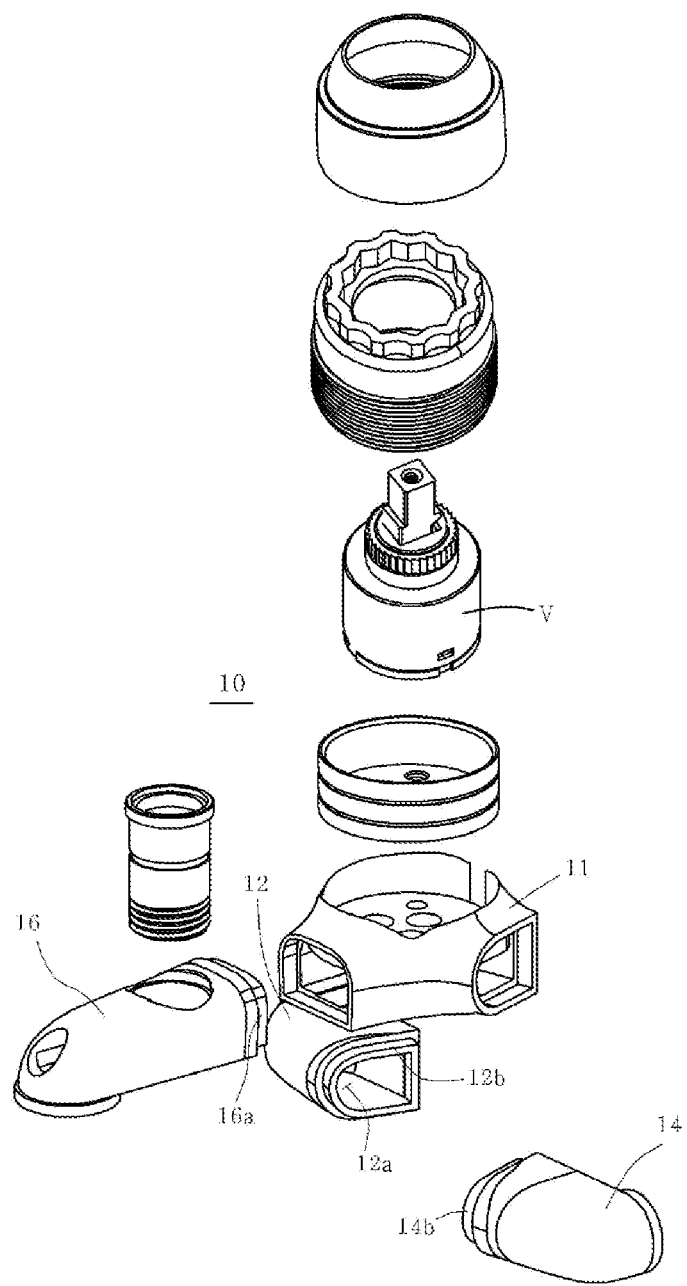
FIG. 2 is an exploded perspective view illustrating each part of the main body of a faucet according to the present invention.
Figure 3:
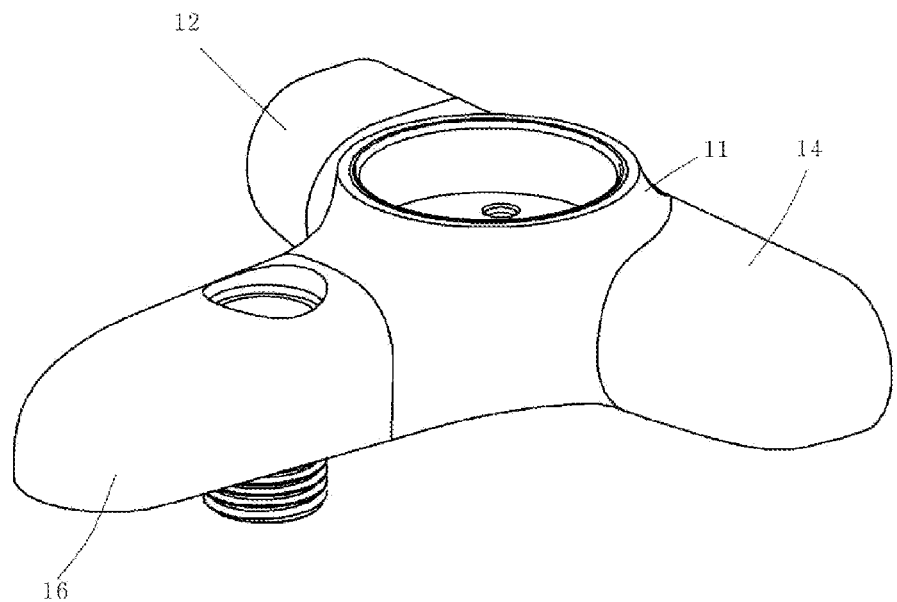
FIG. 3 is a perspective view of the main body of a faucet which is assembled with the base body and there parts illustrated in FIG. 2.
Figure 4:
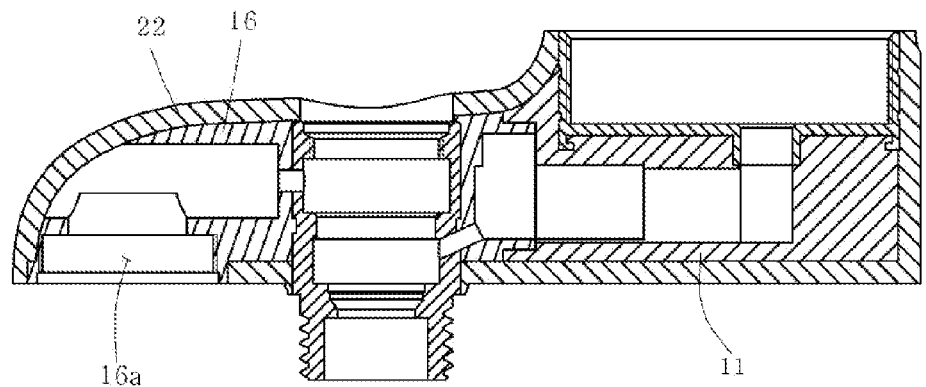
FIG. 4 is a longitudinal sectional view of the main body of a faucet according to the present invention in order to illustrate the inside structure of the main body of a faucet.

Hereinbelow, preferred embodiments of the present invention will be described in detail with reference to the accompanying drawings.

Referring to the drawings, according to the present invention, a main body 10 of a faucet is provided having a hot water inlet 12a and a cold water inlet 14a at both side portions, respectively and a water discharge port 16a in which hot water and cold water are mixed, a valve V for stopping a flow of water and a lever (not shown) for adjusting the valve.

The main body 10 of a faucet comprises a base body 11, a first part 12, a second part 14, and a third part 16, which are separately formed respectively in the first step S10 of the manufacturing method of the present invention.

The base body 11, the first part 12, the second part 14, and the third part 16 are formed of a composition of ABS resin and fiber glass.

The first part 12 and the second part 14 may have a nut, respectively for fastening on a water pipe by an injection molding.

The composition of ABS resin and fiber glass preferably has less deformation property in high temperatures, and based on a total amount of the ABS resin 100 parts by weight, an amount of the glass fiber is preferably 15 parts by weight to 30 parts by weight.

The ABS resin is a thermoplastic resin making up for shortcomings of polystyrene and AB resins, articles formed of the composite of ABS resin and glass fiber are known as having good properties in tensile strength, size stability, impact resistance, heat resistance, electrical characteristics, oil-resistance, chemical resistance and mechanical properties.

The base body 11 is formed so as to install a valve V, a hot water inlet 12a and a connection portion 12b are formed at the first part 12 and a cold water inlet 14a and a connection portion 14b are formed at the second part 14.

A water passage 16a and a connection portion 16b are formed at the third part 16.

The connection portions 12b, 14b and 16b has a fitting structure, respectively.

According to the second step S20 of the manufacturing method of the present invention, the base body 11 and the three parts 12, 14 and 16 are assembled in one assembly and a molded portion 22 is formed on an exterior of the assembly.

The assembly of the base body 11 and the three parts 12, 14 and 16 is overlaid with the external molded portion 22 by injection-molding of the ABS resin molten at temperature of 190° C. to 210° C.

The external molded portion 22 by injection-molding of the ABS resin integrates the assembly of the base body 11 and the three parts 12, 14 and 16 to have improved durability.

Also, the external molded portion reinforces the assembly and hides the boundaries of the base body 11 and the three parts 12, 14 and 16.

According to the third step S30 of the manufacturing method of the invention, the external molded portion 22 is plated with nickel-chromium for protection of the surface thereof, thereby completing the manufacturing of the main body of the faucet, which has the same shape as the conventional faucet.

Figure 5:
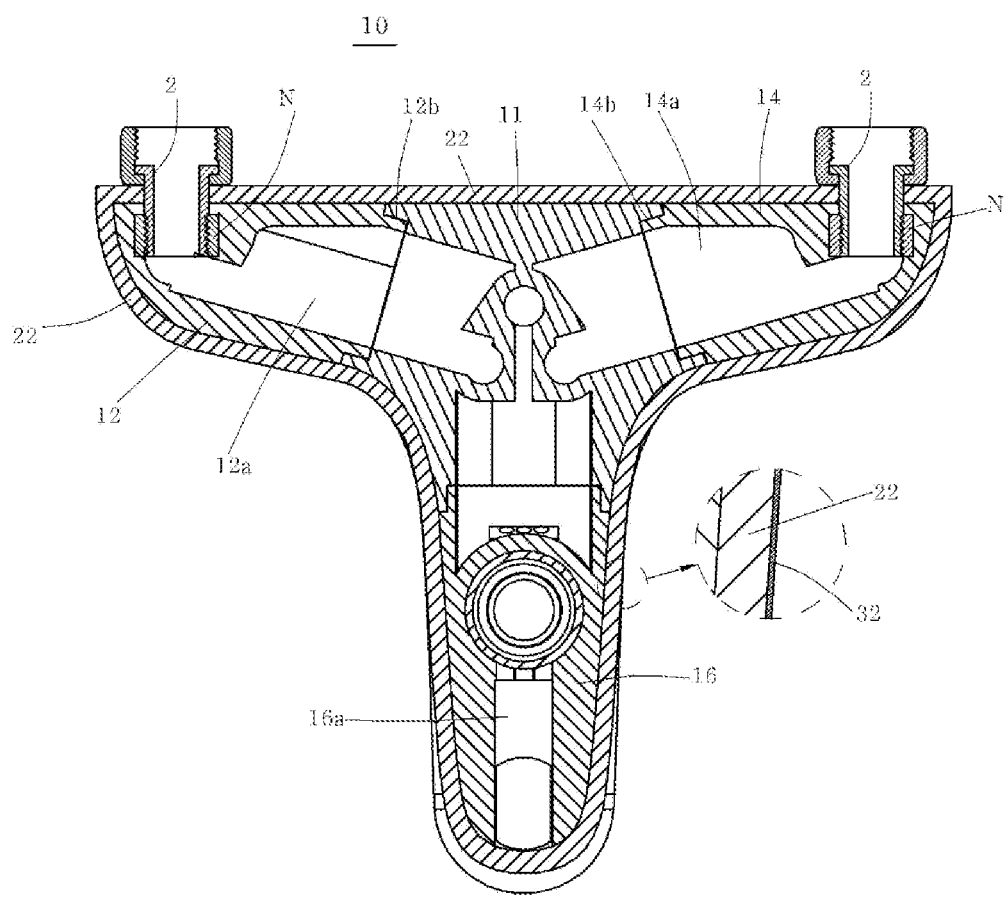
FIG. 5 is a cross-sectional view of the main body of a faucet according to the present invention.

Enlarged portion in FIG. 5 shows the protection layer 32 of nickel-chromium.

The main body 10 manufactured in accordance with the three steps of the present invention is coupled to a water pipe by fastening the nut N, which is embedded in the forming process of the first part 12 and the second part 14, to the connecting member 2 of the water pipe.

Therefore, the faucet according to the present invention may be manufactured without molding and joining processes of brass parts and thereby enabling mass production of a faucet.

The persons skilled in this art will be understood that functional parts of the faucet in accordance with this invention may be produced in different ways than those described above and illustrated in the accompanying drawings within the scope of the invention as claims below.

MODE FOR INVENTION

10: main body of a faucet
11: base body
12: first part
14: second part
16: third part
22: external molding portion
32: protection layer of nickel-chromium

The invention claimed is:

1. A method for manufacturing a main body of a faucet which has a hot water inlet and a cold water inlet at both sides, respectively, and a cold/hot water discharge port, in which hot water and cold water are mixed, and is equipped with a valve for stopping a flow of the cold/hot water at an upper portion and a lever for adjusting the valve, the method comprising:

separately molding a base body in which the valve is installed, a first part in which a hot water passage and a first connecting portion are formed, a second part in which the cold water inlet and a second connecting portion are formed, and a third part in which the cold/hot water discharge port and a third connecting portion are formed, the base body and the first, second and third parts being formed of a composition of a resin and glass fibers and combining respectively the base body with the first, second and third connecting portions of the first, second and third parts to create a preliminary main body;

integrating the base body and the first, second and third parts into the main body of the faucet by forming an external molded portion overlaid on the surfaces of the combined preliminary main body with the resin molten at a temperate of 190° C. to 210° C. by an injection molding process; and plating nickel-chromium on an exterior of the main body for protection of the external molded portion.

2. The method according to claim 1, wherein the first part and the second part have a nut, respectively for fastening on a water pipe, the nut being manufactured by an injection molding.

3. The method according to claim 1, wherein the composition of the resin and the glass fibers comprises, based on a total amount of the resin, 100 parts by weight, an amount of the glass fiber which is 15 parts by weight to 30 parts by weight.

\* \* \* \* \*